(12) United States Patent
Corey et al.

(10) Patent No.: US 6,932,309 B1
(45) Date of Patent: Aug. 23, 2005

(54) HOLDER FOR AN ELECTRONIC DEVICE

(76) Inventors: Donald Charles Corey, 919 Brookside Dr., Raleigh, NC (US) 27604; Vanese Lynn Clough, 919 Brookside Dr., Raleigh, NC (US) 27604

( * ) Notice: Subject to any disclaimer, the term of this patent is extended or adjusted under 35 U.S.C. 154(b) by 33 days.

(21) Appl. No.: 10/751,241

(22) Filed: Jan. 2, 2004

(51) Int. Cl.[7] ................................................ A47F 5/08
(52) U.S. Cl. .................. 248/231.9; 248/505; 248/693; 248/912; 224/483; 224/572; 224/929; 379/454; 379/455; 24/18; 24/130
(58) Field of Search ................................ 248/690, 693, 248/912, 505, 231.9, 328, 680; 379/446, 379/449, 454, 455; 224/483–485, 563, 568, 224/572, 929, 930; 24/17 AP, 18, 16 R, 129 A, 24/129 B, 129 R, 130, 128

(56) References Cited

U.S. PATENT DOCUMENTS

| | | | | |
|---|---|---|---|---|
| 439,786 | A | * 11/1890 | Low | ............................ 24/17 R |
| 2,271,288 | A | * 1/1942 | Cuff | ............................ 24/130 |
| D203,101 | S | * 12/1965 | Holder | ......................... D3/218 |
| 3,238,585 | A | * 3/1966 | Froyd | ....................... 24/129 B |
| 3,675,276 | A | * 7/1972 | Nuse | ......................... 24/129 B |
| 5,187,744 | A | 2/1993 | Richter | |
| 5,285,938 | A | 2/1994 | Fauchald | |
| 5,697,071 | A | 12/1997 | Fan | |
| D392,646 | S | 3/1998 | Takayasu | |
| 5,860,573 | A | * 1/1999 | Hossack et al. | ............. 224/483 |
| 5,941,434 | A | * 8/1999 | Green | ......................... 224/250 |
| 6,085,113 | A | 7/2000 | Fan | |
| 6,185,302 | B1 | 2/2001 | Rytkonen | |

(Continued)

FOREIGN PATENT DOCUMENTS

JP     09279908 A   * 10/1997   ........... E04H 15/62

*Primary Examiner*—Korie Chan

(57) ABSTRACT

An apparatus and method for holding a portable electronic device, comprising a base formed of thin, flat, rigid, material, and having, in a lower portion a first, substantially unbroken, flat surface, against which the inner lower surface of the device can be mounted; in any upper bifurcated portion a central slot with a relatively wide open upper end and a relatively narrow closed lower end adjoining the lower portion, and on the sides of the slot open upper end a pair of upwardly-extending, laterally-spaced, second and third mounting surfaces, against which spaced-apart inner upper surfaces of the device can be mounted; a first pair of holes formed in the outer ends of the second and third mounting surfaces; a second hole formed in a lower end of the lower portion; a plurality of inwardly-extending notches formed in the outer edge surfaces of the lower and upper portions; a cord having each of two end portions threaded through the first pair of holes; a middle portion formed as a loop and threaded through the second hole; on each end of the cord a resilient wedge; wherein the device, when equipped with a mounting clip or button, is adapted to be detachably secured to the base by being mounted on the closed lower end of the slot, and if not so equipped is adapted to be strapped to the base by use of the cord and by use of the wedge members is adapted to be suspended from a structure formed so as to receive, squeeze, and detachably hold the wedge members and thereby suspend the base.

13 Claims, 3 Drawing Sheets

U.S. PATENT DOCUMENTS 6,360,083 B1 3/2002 Fan
2002/0090083 A1 * 7/2002 Grant et al. ............... 379/454
2005/0045681 A1 * 3/2005 Hancock et al. ............ 224/401

* cited by examiner

US 6,932,309 B1

HOLDER FOR AN ELECTRONIC DEVICE

CROSS REFERENCE TO RELATED APPLICATIONS

None Applicable

FIELD OF THE INVENTION

The present invention relates to a holder for portable electronic devices. In particular, the present invention relates to an adjustable holder that can be mounted in the interior of a vehicle, and that can securely hold a portable telephone, wireless internet device, MP3 player, PDA, or walkie-talkie in position.

BACKGROUND-DESCRIPTION OF THE PRIOR ART

Portable communications devices and data storage devices-cellular telephones or "cell phones", walkie-talkies, wireless internet devices, such as the Blackberry™, portable music players and storage devices such as the MP3 player and the Apple® iPod™, portable digital assistants (PDAs), and so forth—are becoming increasingly popular. Consumer acceptance and demand for these devices is driven by their convenience, versatility, and increasingly small size and light weight. In many remote areas, the only way to obtain reliable telephone service—or any telephone service at all—is via cellular telephone.

Because these devices are portable, their owners take them and use them everywhere, including in motor vehicles (cars, boats, airplanes, tractors, etc.). A cell phone or other portable communications device can usually be stored in a handbag, briefcase, or pocket when not in use. However, it is frequently necessary to use the device while in a vehicle, and few vehicles are equipped with suitable holders for these types of devices.

Holders for cell phones and other devices are available; some of these are adjustable for use with telephones of different sizes. However many of these holders will work only for a particular type of cell phone and many cannot be used with other electronic devices.

U.S. Pat. No. 5,285,938 to Fauchald shows a device where the portable phone slides into a "U" shaped cavity where a snap device presses on the side of the phone to give it a friction fit in the holder. This invention will work well for portable phones of a specific width or depth but will not work for electronic devices where there is a significant variation in the width or depth of the device. Portable phones, PDAs, MP3s and portable music players come in all different widths and depths and will not all fit in the device. The device also precludes the attachment of charging cords or other electronic attachments such as ear phones or computer cables from certain areas of the holder where the holder interferes with access to charging, earphone or data ports. Another invention that will fit a very limited range of portable electronic devices due to the depth or width of the holders is U.S. Pat. No. D392,646 to Tetsufumi. The Tetsufumi invention details a holder that will fit only a specific size of portable electronic device. It closes off access to the sides and bottom of the device and limits the number and type of attachments that may be used with the device while carried in the holder.

U.S. Pat. No. 6,185,302 to Rytkoen, U.S. Pat. No. 6,085,113 to Fan, U.S. Pat. No. 5,697,071 to Fan and U.S. Pat. No. 5,187,744 to Richter all show portable phone holders that have adjustable and/or spring loaded sides that hold the phone by pressing on each side with some type of clamping or friction surface. All of these inventions cover much of the side of the phones and may interfere with the attachment of earphones, chargers or other data access cables. These types of inventions make it difficult to operate some types of phones where operation buttons are on the side of the phone and not just on the front keypad. These inventions all require some type of permanent mounting in the vehicle and are not easily transportable between vehicles without installing a new attachment bracket.

Many presently-available holders can only be used with a specific size or even a specific model of device. Others require complicated adjustments, or are inconvenient for users who frequently move their cell phones (or other devices) to different locations. Some require use of spaces or devices within the motor vehicle that might be otherwise useful, for example, a molded-in cupholder or the DC voltage plug-in. Yet others restrict access to regions of the communication device that are imperative to its use, especially in a motor vehicle, such as the power port or hands free port.

There is a need for a simple, versatile holder that can be mounted in the interior of a vehicle, and that can be adjusted to securely yet removably hold portable communications devices of different sizes and configurations.

SUMMARY OF THE INVENTION

According to its major aspects, and broadly stated, the present apparatus and method for use is a holder for portable communications devices and data storage devices, such as cellular telephones (often referred to as "cell phones"), wireless internet devices such as the Blackberry™, walkie-talkies, portable digital assistants (PDAs), MP3 players, and other portable devices for storing and playing music. The holder of the invention generally comprises a flat base, a length of flexible cord, and a pair of mounting wedges attached to the ends of the cord.

OBJECTS AND ADVANTAGES

Other features and advantages of the present invention will become apparent to those skilled in the art from the Detailed Description presented below and the drawings.

DETAILED DESCRIPTION OF THE PREFERRED EMBODIMENTS

Figure 1:
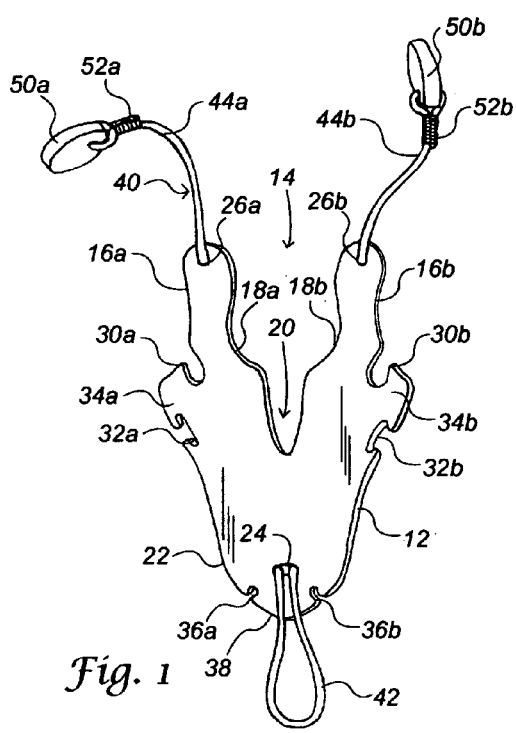
FIG. 1 is a front view of a holder made according to the invention.

In the following detailed description of the invention, reference numerals are used to identify structural elements, portions of elements, surfaces, or areas in the drawings, as such elements, portions, surfaces, or areas may be further described or explained by the entire written specification. For consistency, whenever the same numeral is used in different drawings, it indicates the same element, portion, surface, or area as when first used. Unless otherwise indicated, the drawings are intended to be read together with the specification and are to be considered a portion of the entire written description of the invention. As used herein, the terms "horizontal," "vertical," "left," "right," "up," and "down," as well as adjectival and adverbial derivatives thereof, refer to the relative orientation of the illustrated structure as the particular drawing figure faces the reader.

Referring now to FIGS. 1–8, there is shown a front view of a holder 10 for a cell phone, or other portable electronic device, according to an embodiment of the present invention. As used herein, the term "portable electronic device" includes cell phones (also termed "cellular telephones" or "portable telephones"), walkie-talkies, wireless internet devices, such as the Blackberry®, portable music players such as the MP3 player and the Apple® ipod™, portable digital assistants (PDAs), with or without communications capability, handheld amateur radio transceivers (particularly 2-meter transceivers), and other portable electronics. Holder 10 is shown in use with a cell phone P; however, it should be understood that the holder 10 can readily be used with other portable communications devices.

Holder 10 includes a generally flat base 12 with a central opening 14 defining a pair of extensions 16a, 16b at its upper end. Opening 14 is shaped by a pair of surrounding shoulder portions 18a, 18b located above a slot 20. A lower end 22 of base 12 is formed with a hole 24 and adjoins upper extensions 16a, 16b, through which holes 26a, 26b are formed. Two oppositely-located pairs of notches 30a, 32a, 30b, 32b, are formed in opposing sides of base 12 and define projections 34a and 34b, respectively. A similar pair of notches 36a, 36b formed at the lower end 22 define a projection 38.

Figure 2:
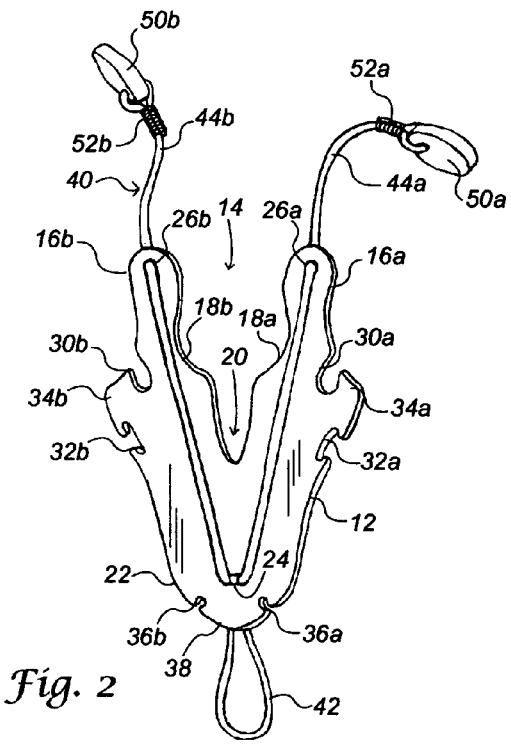
FIG. 2 is a rear view of the holder of FIG. 1.

A cord 40 is installed in base 12 generally, as shown in FIGS. 1 and 2, with a loop 42 drawn through hole 24 and ends 44a, 44b drawn through holes 26a, 26b respectively. A pair of resilient plastic foam wedges 50a, 50b are attached to ends 44a, 44b via cord couplers 52a, 52b, other convenient fasteners, suitable adhesive, or molding technique. In one embodiment, the wedges 50a, 50b were made of a 7/16" thick, 1" diameter segment of plastic foam material, through which the cord 40 was passed. It is contemplated that the resilient foam wedges 50a, 50b may be made of materials other than plastic, such as, for example, soft rubber or any other material that would, in the context of the invention, i.e., be flexible, shapeable, and resilient.

Base 12 is preferably made of plastic, but may also be formed of wood, metal, a composite, or other material suited to being shaped into the configuration described. Cord 40 is made of a flexible material, and preferably of a material that is somewhat elastic, such as a so-called "bungee" cord.

Figure 3:
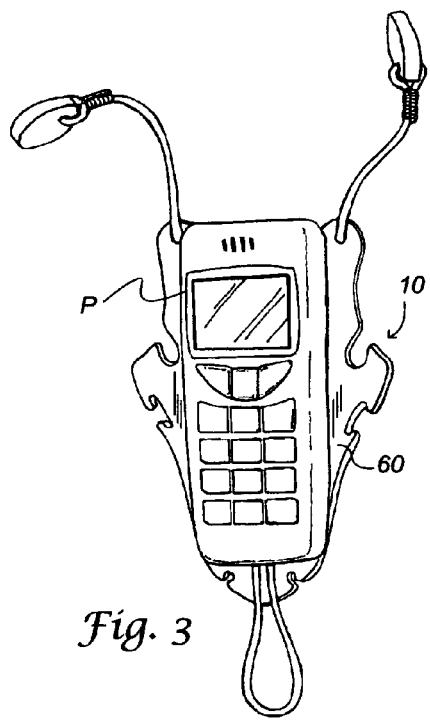
FIG. 3 is a front view, showing a detachably mounted cell phone mounted by means of a hook on the holder of FIG. 1.
Figure 4:
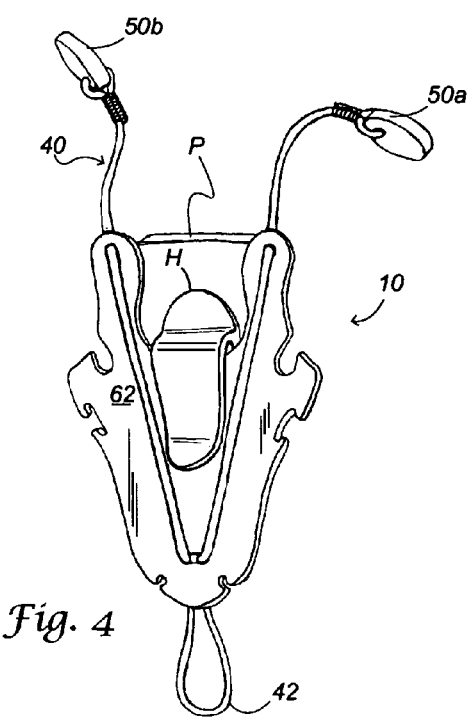
FIG. 4 is a rear view of FIG. 3, showing the cell phone with its hook attachment mounted on the holder of FIG. 1.
Figure 5:
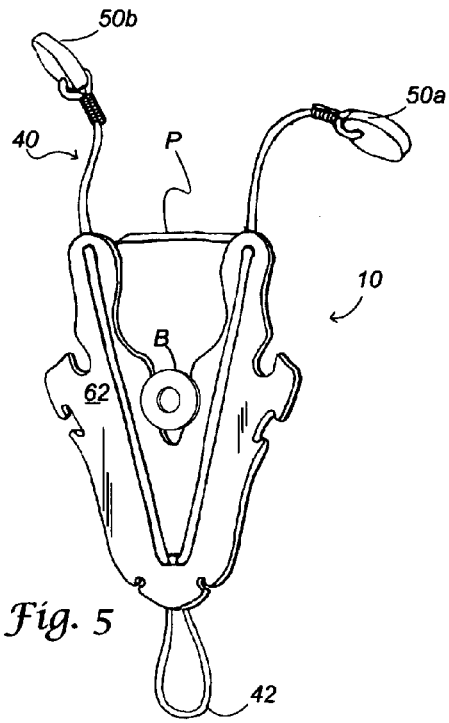
FIG. 5 is a rear view, similar to that of FIG. 4, but illustrating a cell phone detachably mounted by means of a button attachment on the holder of FIG. 1.

FIG. 3 shows a call phone P detachably attached to holder 10 and in engagement with a front face 60 of the holder. Cell phone P may be the type of device that is equipped with a hook or a button for attachment to a belt, clip, or the like, both of which are readily accommodated by holder 10. A hook H of cell phone P, for example, clips onto shoulders 18a, 18b (FIG. 4), whereas a button B, as a further example, is slidable into slot 20 (FIG. 5). As will be evident, the dimensions of opening 14, shoulders 18a, 18b, and slot 20 are such as will receive typical cell phones (or other devices) with hook or button attachments. In addition, it is recognized that a Velcro® patch (not shown) could be attached to the face of base 12 to receive a counterpart patch attached to phone P.

Figure 6:
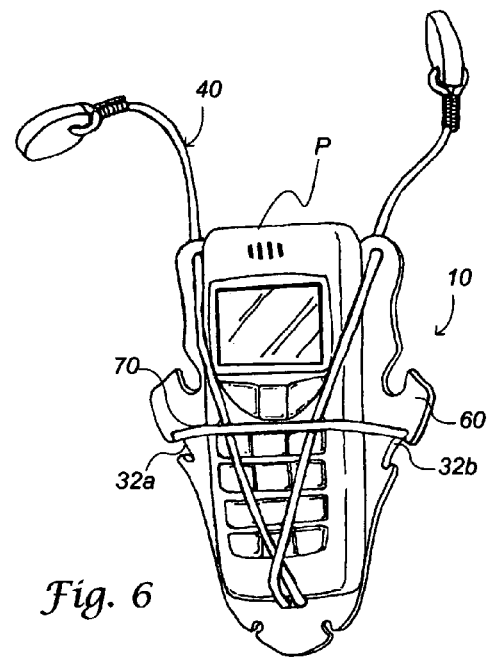
FIG. 6 is a front view of the holder of FIG. 1, showing the cord used as a cradle to secure a cell phone.
Figure 7:
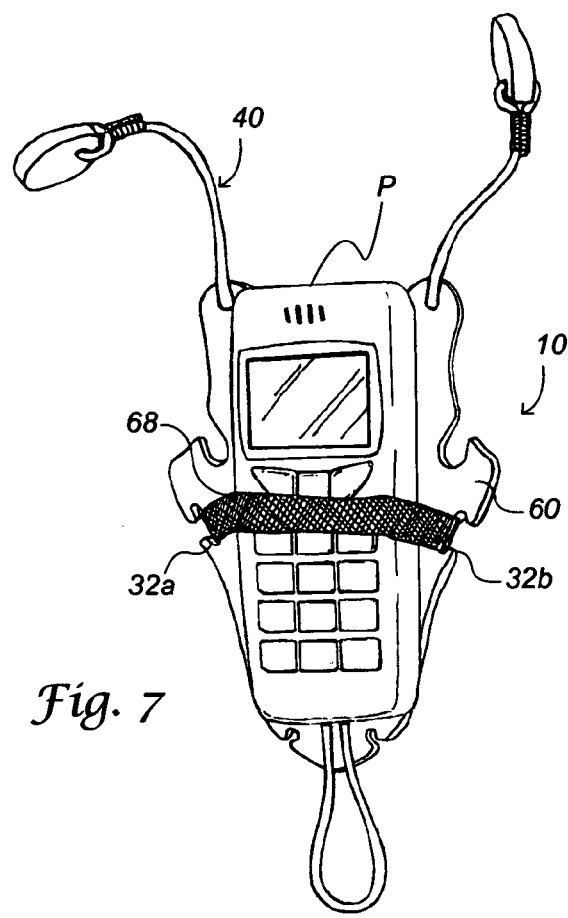
FIG. 7 is a front view of the holder of FIG. 1, showing a resilient band used to secure a cell phone.

Not all cell phones have suitable hooks or other devices that can be installed in shoulders 18a, 18b or slot 20 of holder 10. These types of cell phones may, however, be secured to holder 10 by cord 40, as shown in FIG. 6. Here cord 40 is looped around and across cell phone P, with at least one loop (such as loop 70) engaged in a pair of notches (such as notches 32a, 32b). Any combination of notches 30a–30b, 32a–32b, 36a–36b may be used to secure cell phone P to holder 10; the choice depends on the relative sizes of the cell phone and the holder, the configuration of the cell phone, and the individual user's preferences. Another option to secure cell phone P to holder 10 is by resilient band 68 that engages notches 32a–32b as shown in FIG. 7.

Figure 8:
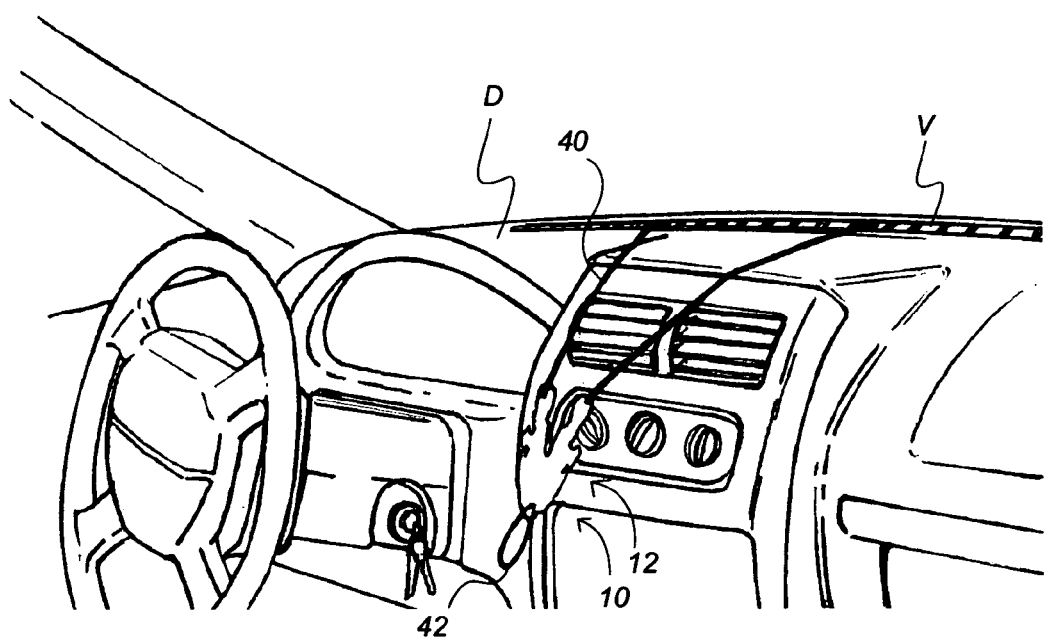
FIG. 8 is a perspective view, showing the holder of FIG. 1 with ends of its cord release-ably attached to the dashboard of an automobile and in position for mounting a cell phone or other device.

FIG. 8 shows holder 10 mounted in the interior of a typical automobile. Foam wedges 50a, 50b are inserted into two openings in the defroster or other air vent V of dashboard D. The position of base 12 depends from a length of cord 40, which can be adjusted to suit the individual user by adjusting the length of loop 42. When attached to base 12, as described above, a cell phone is suitably mounted to the automobile, yet readily available for use when needed.

A holder 10, according to the present apparatus and method for use, can be used in all vehicles that have any openings suitable for receiving foam wedges 50a, 50b, including, but not limited to, automobiles, boats, aircraft, tractors, and recreational vehicles (snowmobiles and the like). Because of the flexible configuration of base 12, the adjustability of cord 40, holder 10 can be used with a wide variety of cell phones and other communications devices.

It is recognized that a cushion pad (not shown) can be added to the face of base 12, to absorb shock between base 12 and phone P. Holder 10 can be moved left or right relative to the dashboard D by changing the length of cord sections 44a and 44b independently and taking up slack in loop 42. Notches 30a or 30b can be used to hold an ear bud of a hands free device for phone P or ear bud of a headset for a music player.

With respect to the above description of the invention, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. In short, it is the applicant's intention that that scope of the patent issuing herefrom will be limited only by the scope of the appended claims.

Therefore, the forgoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the embodiments herein described without departing from the spirit and scope of the present invention, as defined by the appended claims.

We claim:

1. An apparatus for holding a portable electronic device, comprising:
   a) a base member formed of thin, flat, rigid material, and having
      i) a lower portion with a first substantially flat surface against which an inner lower surface of the device can be mounted;
      ii) an upper bifurcated portion defining a central slot with a relatively wide open upper end and a relatively narrow closed lower end adjoining said lower portion, and on the sides of said slot open upper end a pair of upwardly-extending, laterally-spaced, second and third mounting surfaces, against which spaced-apart inner upper surfaces of the device can be mounted;
      iii) a first pair of holes formed in the outer ends of said second and third mounting surfaces;
      iv) a second hole formed in a lower end of said lower portion;
      v) a plurality of inwardly-extending notches formed in the outer edge surfaces of said lower and upper portions;
   b) a cord having
      i) each of two end portions threaded through said first pair of holes;
      ii) a middle portion formed as a loop and threaded through said second hole; and
      iii) a resilient wedge member is on each end of said cord; and
   c) wherein said device, when equipped with a mounting clip or button, is adapted to be detachably secured to said base member by being mounted on said closed lower end of said slot, and if not so equipped is adapted to be strapped to said base member by use of said cord, and by use of said wedge members said apparatus is adapted to be suspended from a structure formed so as to receive, squeeze, and detachably hold said wedge members and thereby suspend said base member.

2. The apparatus as recited in claim 1, wherein said cord is at least somewhat elastic.

3. The apparatus as recited in claim 1, further comprising means for securing a portable electronic device to said base.

4. The apparatus as recited in claim 1, wherein said base member comprises plastic.

5. The apparatus as recited in claim 1, wherein said wedge member comprises foam.

6. The apparatus as recited in claim 1, wherein aid base member comprises a material selected from the group consisting of plastic, wood and metal.

7. The apparatus as recited in claim 1, wherein said wedge member comprises a material selected from the group consisting of foam and rubber.

8. An apparatus for holding a portable electronic device, comprising:
   a) a base member formed of thin, flat, rigid material, and having
      i) a lower portion with a first substantially flat surface against which an inner lower surface of the device can be mounted;
      ii) an upper bifurcated portion defining a central slot with a relatively wide open upper end and a relatively narrow closed lower end adjoining said lower portion, and on the sides of said slot open upper end a pair of upwardly-extending, laterally-spaced, second and third mounting surfaces, against which spaced-apart inner upper surfaces of the device can be mounted;
      iii) a first pair of holes formed in the outer ends of said second and third mounting surfaces;
      iv) a second hole formed in a lower end of said lower portion;
   b) a cord having
      i) each of two end portions threaded through said first pair of holes;
      ii) a middle portion formed as a loop and threaded through said second hole; and
      iii) a resilient wedge member is on each end of said cord; and
   c) wherein said device, when equipped with a mounting clip or button, is adapted to be detachably secured to said base member by being mounted on said closed lower end of said slot, and by use of said wedge members said apparatus is adapted to be suspended from a structure formed so as to receive, squeeze, and detachably hold said wedge members and thereby suspend said base member.

9. The apparatus as recited in claim 8, wherein said cord is elastic.

10. The apparatus as recited in claim 8, wherein said base member comprises plastic.

11. The apparatus as recited in claim 8, wherein said wedge member comprises foam.

12. The apparatus as recited in claim 8, wherein aid base member comprises a material selected from the group consisting of plastic, wood and metal.

13. The apparatus as recited in claim 8, wherein said wedge member comprises a material selected from the group consisting of foam and rubber.

* * * * *